United States Patent [19]

Popper

[11] Patent Number: 4,674,725
[45] Date of Patent: Jun. 23, 1987

[54] ADAPTIVE-CONTROLLED VIBRATION MOUNT

[75] Inventor: Jakhin B. Popper, Kiryat Haim, Israel

[73] Assignee: Popper Technologies (1983) Ltd., Kiryat Haim, Israel

[21] Appl. No.: 768,105

[22] Filed: Aug. 21, 1985

[30] Foreign Application Priority Data

Sep. 6, 1984 [IL] Israel ........................................ 72881

[51] Int. Cl.$^4$ ............................................ F16M 13/00
[52] U.S. Cl. .................................... 248/562; 188/380; 248/636
[58] Field of Search ............... 248/562, 575, 578, 636, 248/568, 569; 267/140.2, 140.3, 180, 150; 188/380

[56] References Cited

U.S. PATENT DOCUMENTS

| 2,091,842 | 8/1937 | West | 267/180 X |
| 2,852,223 | 9/1958 | Roberts | 248/578 X |
| 3,727,902 | 4/1973 | Burckhardt et al. | 267/180 |
| 4,537,382 | 8/1985 | Beck | 248/636 X |

FOREIGN PATENT DOCUMENTS 1050638 1/1954 France ........................................ 188/380

Primary Examiner—J. Franklin Foss
Assistant Examiner—David L. Talbott
Attorney, Agent, or Firm—Benjamin J. Barish

[57] ABSTRACT

An adaptive, controlled vibration mount comprises a base and a load support arranged for relative vibrational motion; a restoring spring mounted between the base and the load support; and an arrangement for applying selected variable Coulomb frictional damping to the relative vibrational motion such that the amount of variable frictional damping increases non-linearly as a function of increasing amplitude of the relative vibration motion.

29 Claims, 32 Drawing Figures

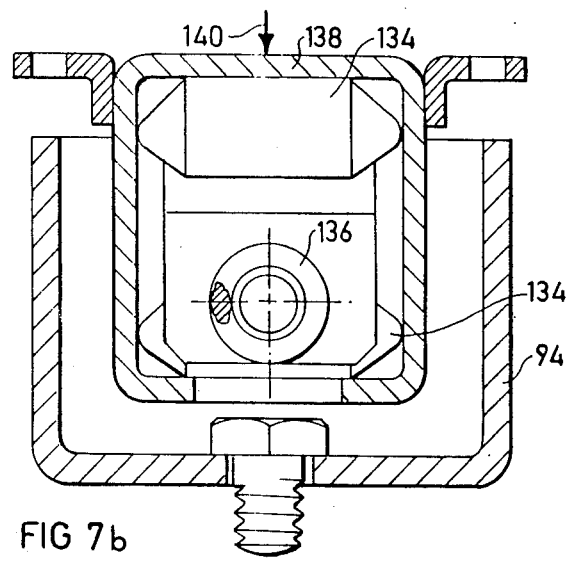
FIG 7b
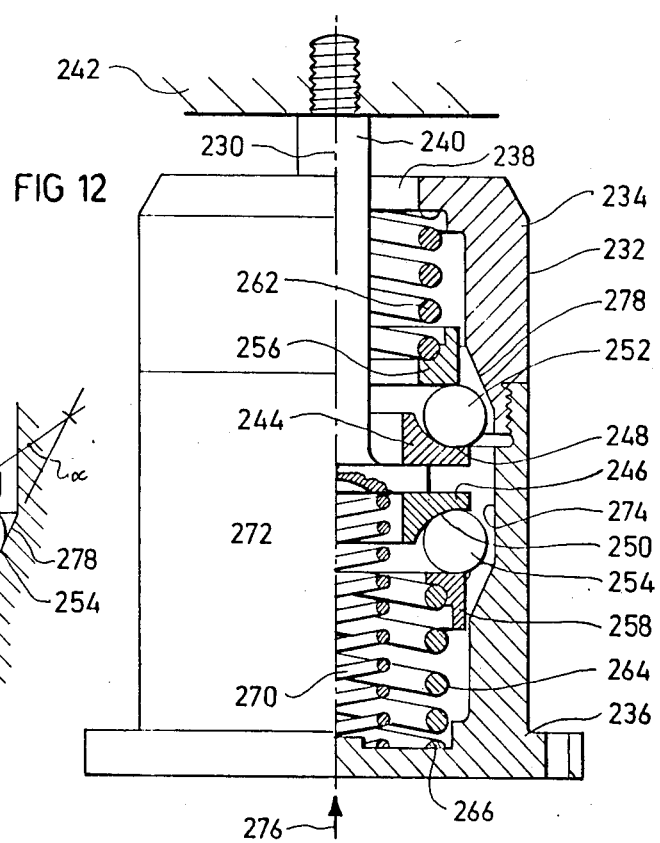
FIG 12
FIG 13

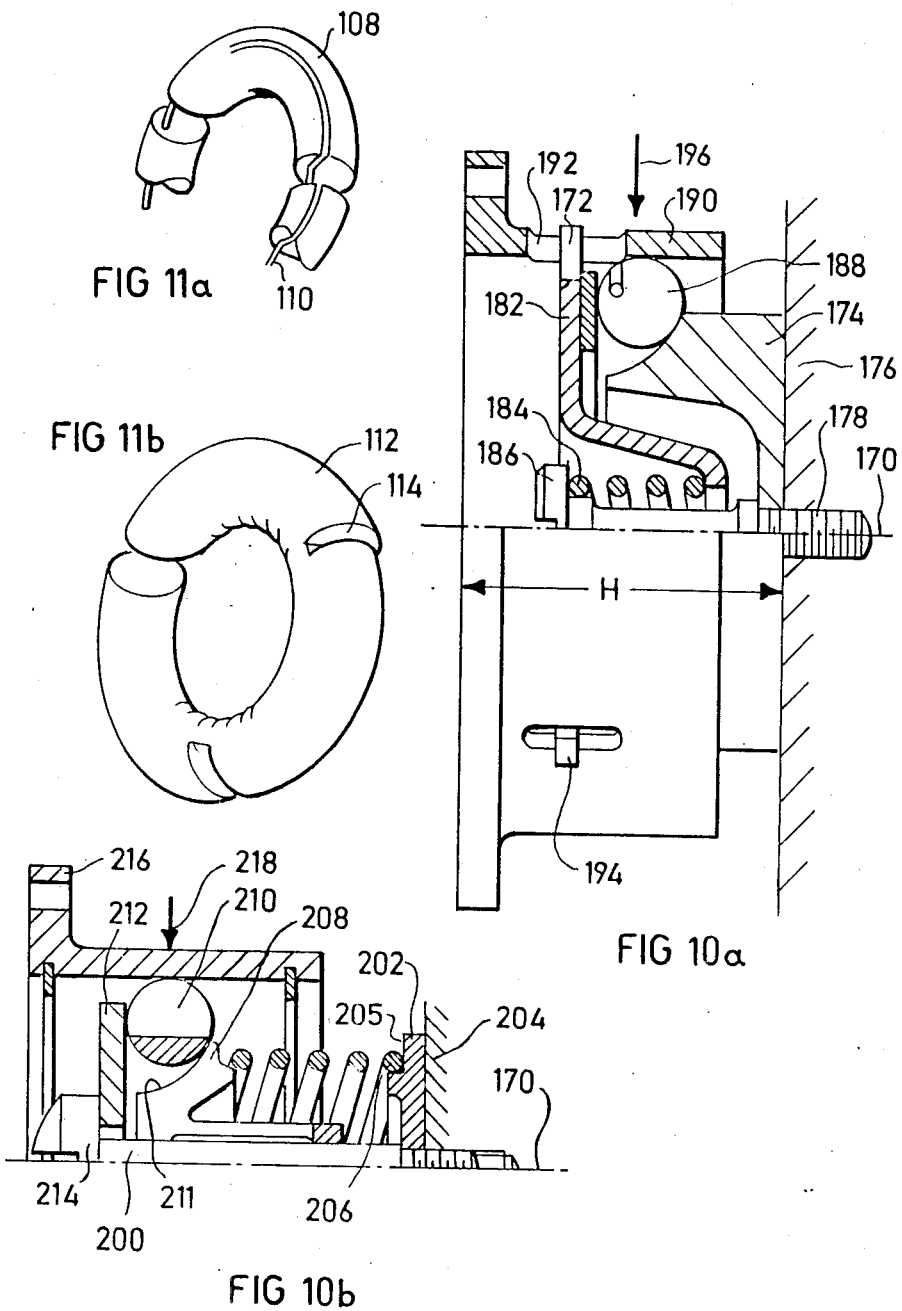

ADAPTIVE-CONTROLLED VIBRATION MOUNT

FIELD OF THE INVENTION

The present invention relates to shock and vibration mounting apparatus for sensitive loads.

BACKGROUND OF THE INVENTION

With the advent of the widespread introduction of electronic circuits into mass produced vehicles, such as automobiles and aircraft, and other products such as military equipment including projectiles, there has arisen a need for reliable, inexpensive vibration mounted for such circuits in order to protect their integrity against various shocks which are encountered during normal vehicle operation.

In the design of vibration mounts based on prior art teachings, the damping friction is normally raised as much as possible so as to reduce and limit Tmax, the maximum transmissivity, or, in other words, the maximum displacement of the mounted mass M per unit displacement of the base.

There are also known vibration mounts incorporating a body of wire mesh or similar material. Flexing of such material provides Coulomb friction resistance up to a predetermined maximum at which the wire mesh becomes compressed so that both friction and stiffness are increases significantly.

The wire mesh mount has a number of deficiencies:

1. It is capable of dissipating only limited energy unless the friction force is greatly increased. Such an increase in friction can result in significant forces being transferred to the supported mass.
2. The supported mass does not normally return to a defined rest position.
3. After a time, the wire mesh may become compressed and set and thus behave as a rigid mount. In order to overcome this problem, an additional spring is sometimes associated with the mesh. However, the characteristics of the spring often outweigh the characteristics of the wire mesh and its increased stiffness.
4. Perhaps most importantly, the behavior of the wire mesh spring mount cannot be calculated precisely because it depends on the relative orientation and tightness of the individual wires in the mesh which tend to change over time as a a function of the use thereof.

SUMMARY OF THE INVENTION

The present invention seeks to provide shock and vibration mounting apparatus which is based on a conception diametrically opposed to the prior art teaching of increasing the damping friction and on the appreciation that lowering the damping friction actually decreases the transmissivity over most of the operating range of the vibration mounting apparatus.

According to the present invention, there is provided a vibration mounting for mounting a load support to a base, comprising: at least two relatively movable members coupled to the base and load support, respectively; and a restoring spring deflectable by relative motion between the movable members in a predetermined direction; the relatively movable members including contacting friction surfaces producing Coloumb friction damping which increases non-linearly with the amplitude of movement of one member with respect to the other in the predetermined direction, and which opposes the movement of the load support relative to the base in the predetermined direction.

Coulomb frictional damping is defined as frictional damping produced by Coulomb frictional force, which is the tangential force between two rubbing surfaces resulting from the normal force between the two surfaces.

The restoring spring may be a linear spring whose spring force increases linearly as a function of its deflection, while the contacting friction surfaces of the relatively movable members effect a non-linear motion of one member with respect to the other member; alternatively, the restoring spring may be a non-linear spring whose spring force increases non-linearly as a function of its deflection, while the contacting friction surfaces of the relatively movable members effect a linear motion of one member with respect to the other member.

In one described embodiment, one of the relatively movable members comprises a pivotably mounted lever biased by the restoring spring to bring the contacting friction surface of the lever into engagement with the contacting friction surface of the other member to produce frictional damping which increases non-linearly with the amplitude of movement of one with a contacting friction surface engaging the contacting friction surface of the other movable member.

According to a still further aspect of the present invention, there is provided vibration mounting apparatus comprising: a base and a load support arranged for relative vibrational motion, at least one friction engagement element being arranged for frictional engagement with the load support along at least a part of the displacement range of the load support. The apparatus further includes first and second engagement elements defining respective first and second engagement surfaces for frictional engagement with the at least one friction engagement element; and a restoring spring associated with at least one of the first and second engagement elements for resisting displacement thereof. The friction engagement element is arranged for simultaneous frictional engagement with the load support and the first and second engagement surfaces at a predetermined range of displacement of the load support for providing damping of the displacement of the load support.

It is a particular feature of the present invention that the force-displacement characteristics of the mounting apparatus may be selectably determined for each particular application by suitable selection of the non-linear characteristics of the springs and/or the frictional coupling apparatus included therein.

BRIEF DESCRIPTION OF THE DRAWINGS

The present invention will be understood and appreciated more fully from the following detailed description taken in conjunction with the drawings in which:

FIGS. 7A and 7B are partially cut away side and end view illustrations of a vibration mounting assembly based on construction principles similar to those on which the embodiment of FIGS. 6A, 6B and 6C is based;

FIGS. 10A and 10B are partial illustrations of respective alternative embodiments of vibrations mountings constructed and operative in accordance with an alternative preferred embodiment of the present invention;

FIGS. 11A and 11B are illustrations of ring elements useful in the embodiments of FIGS. 6A–6C, 10A and 10B;

FIG. 12 is a partially cut away general side view illustration of a further preferred embodiment of a vibration mounting constructed and operative in accordance with preferred embodiment of the present invention in an at rest orientation;

FIG. 13 is a detailed illustration of a portion of the apparatus of FIG. 12 in a raised orientation;

DESCRIPTION OF PREFERRED EMBODIMENTS

Figure 1A:
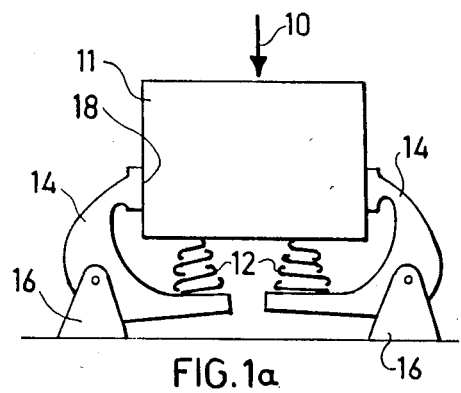
FIGS. 1A and 1B illustrate unidirectional mounting apparatus constructed and operative in accordance with an embodiment of the present invention.
Figure 1B:
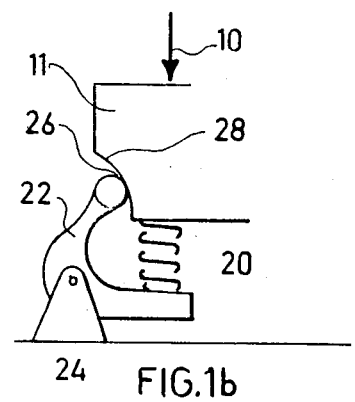

Reference is made to FIGS. 1a and 1b which diagramatically illustrate the principles of operation of the invention. In the embodiment of FIGS. 1A and 1B, there is provided a vibration mounting for damping vibrations applied to a load 11 along an axis indicated by an arrow 10.

In the embodiment of FIG. 1A, the vibration mounting includes non-linear springs 12, whose spring force increases non-linearly, i.e. more than linearly, as a function of the compression thereof. Springs 12 support load 11 and are in turn supported on levers 14 which are pivotably mounted on base members 16. Levers 14 are constructed such that they define, in addition to supports for springs 12, friction engagement portions 18 which are arranged for variable force engagement with the load 11.

The operation of the embodiment of FIG. 1A is as follows: As the amplitude of vibration in the direction indicated by arrow 10 increases, the spring force at springs 12 increases more than linearly, causing the friction engagement force applied by fricton engagement portions 18 on the load to increase more than linearly for damping the vibration of the load at high amplitudes.

The embodiment of FIG. 1B achieves the above result in a different way. Instead of employing a non-linear spring as in the embodiment of FIG. 1A, there is provided a linear spring 20 which is mounted onto a lever 22, pivotably mounted on a base 24. Here, instead of the generally flat friction engagement portion 18 as in the embodiment of FIG. 1A, there is provided a curved friction engagement portion 26 which engages a curved surface 28 of the load. The curvature of surface 28 is such that as the load moves increasingly downward in the direction of arrow 10, the force exerted on the load by engagement portion 26 increases more than linearly.

It may thus be appreciated that the result of non-linearly increasing damping as a function of increasing amplitude is realized alternatively by the use of a non-linear spring with a linear damping engagement or by the use of a linear spring with a non-linear damping engagement. It is also appreciated that a combination of both embodiments could also be employed.

Figure 2:
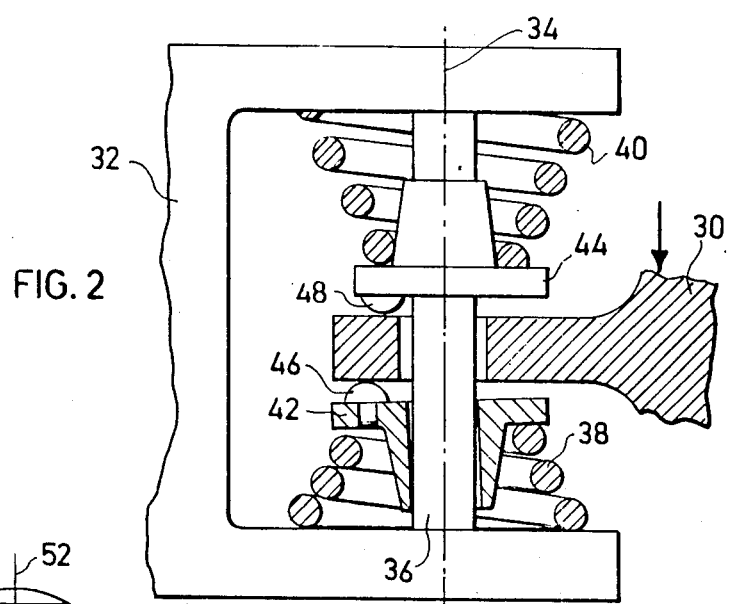
FIG. 2 is an illustration of a bidirectional mounting assembly constructed and operative in accordance with an alternative embodiment of the invention.

Reference is now made to FIG. 2 which illustrates an alternative embodiment of the invention which obviates the need for pivots. The apparatus of FIG. 2 seeks to provide a vibration mounting between an element 30 and an element 32 with respect to vibrations along an axis 34. In this embodiment a rod 36 is defined along axis 34 and is provided with first and second non-linear springs 38 and 40, typically of conical configuration. First and second skewed frictional engagement collar members 42 and 44 are provided intermediate the springs 38 and 40 and on either side of the element 30 and are provided with protrusions 46 and 48 for ensuring their skewed orientation with respect to rod 36.

The operation of the apparatus of FIG. 2 may be appreciated to be as follows: Relative movement of element 30 and element 32 of increasing amplitude causes increasing compression of springs 38 and 40. Since these springs are non-linear, the increase in amplitude of relative displacement between the elements increases the frictional force applied between the rod 36 and the collar members 42 and 44 for damping of the motion. As the element 30 returns to its zero position relative to element 32, the frictional force acts against the spring force, thus reducing overtravel beyond the zero position. Should a static weight be applied to either of the elements, a suitable low rate linear spring may be added to compensate therefor for returning the element 30 to its zero position relative to element 32 along axis 34. It is appreciated that compensation for the application of a static weight may be achieved in this manner, i.e. by adding a low rate linear spring, where suitable, in all of the embodiments of the present invention.

Figure 3:
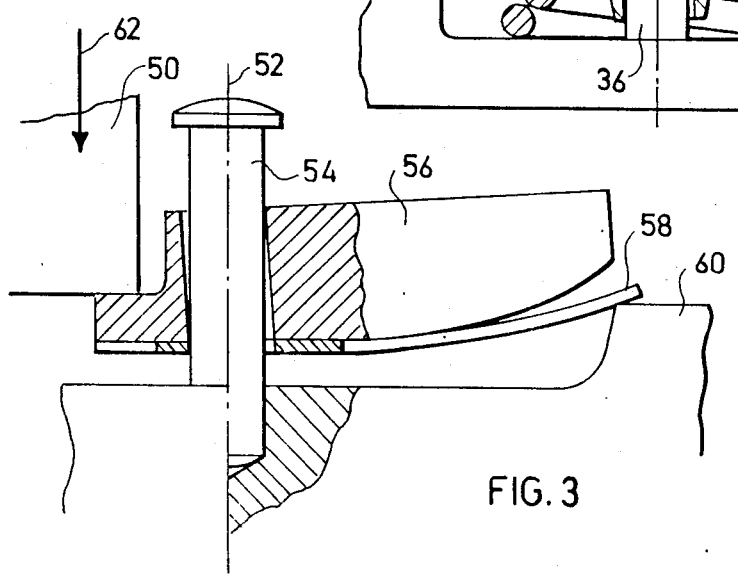
FIG. 3 illustrates a mounting assembly constructed and operative in accordance with an alternative embodiment of the invention.

Reference is now made to FIG. 3 which illustrates an alternative embodiment of vibration mounting wherein a load 50 is arranged for motion parallel to an axis 52. An rod 54 is arranged along axis 52 and a frictionally engageable selectably skewed collar member 56, having a curved underside surface, is disposed about rod 54 as shown. A leaf spring 58 at one end to the underside of collar member 56 and engages at an opposite end a fixed support element 60. The arrangement of the leaf spring and the collar member is such that as the load 50 moves axially downward in a direction indicated by the arrow, it causes downward movement of collar member 56 relative to rod 54. This downward movement encounters non-linearly increasing resistance of leaf spring 58, which also causes correspondingly increased skewing of collar member 56 relative to rod 54 and thus non-linearly increasing frictional force engagement between the collar member and the rod.

It is noted that the embodiments described hereinabove provide vibration mounting protection for vibrations parallel to a given axis. The embodiments described hereinbelow are designed to provide shock and/or vibration protection for vibrations parallel to a given plane.

Figure 4:
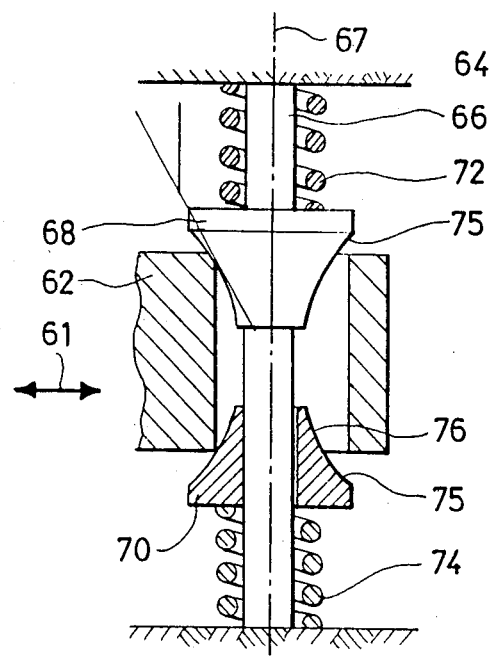
FIGS. 4 and 5 illustrate two versions of a mounting assembly constructed and operative in accordance with a preferred embodiment of the present invention and providing damping in a plane.
Figure 5:
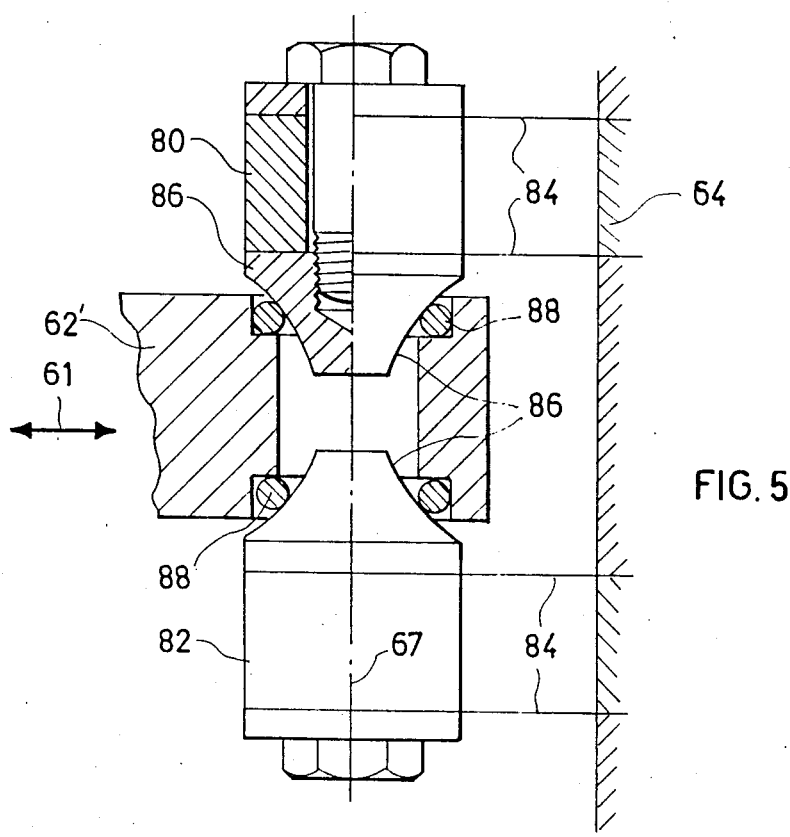

Reference is now made to FIGS. 4 and 5 both of which illustrate apparatus for providing vibration protection for vibrations parallel to a given plane. Considering the embodiment of FIG. 4 there is seen apparatus for providing vibration protection for vibration in a plane indicated at reference numeral 61 between an annular assembly or member 62 and an element 64. The apparatus comprises a rod 66 arranged along an axis 67 perpendicular to the plane of vibration and first and second collar members 68 and 70 and associated linear springs 72 and 74. Collar members 68 and 70 are provided with curved outer engagement surfaces 75 and straight inner surfaces 76 as illustrated, the tangents of the outer surfaces defining an increasing angle α with respect to axis 67 as the surfaces extend towards each other.

It may be appreciated that motion of element 62 relative to collar members 68 and 70 in place 61 causes the collar member 68 and 70 to move axially apart along axis 67 against the linear force of springs 72 and 74 and also causes the internal surface 76 of each of the collar members to be forced against rod 66, providing frictional engagement and resistance to the axial movement therebetween. The changing angle α of the tangent of the collar surfaces 75 causes an increase in the component of the force in the vibration plane producing frictional resistance as a positive non-linear function, i.e., increasing linearly with the amplitude of the displacement of the member 62 relative to rod 66 in the vibration plane.

It is appreciated that non-linear springs may be employed alternatively instead of linear springs. In such an embodiment, collars with conical surfaces having a constant tangent angle may be employed.

The embodiment of FIG. 5 is based on the same general constructional principles as the embodiment of FIG. 4 and differs therefrom in that the play between collar members 68 and 70 is eliminated. Here, as opposed to the embodiment of FIG. 4, annular member 62 is in the form of an annular assembly 62'; in addition, the arrangement of the rod, collar members and linear springs is replaced by first and second non-linear surface defining members 80 and 82, which are oriented along axis 67 perpendicular to the plane of vibration 61 and are mounted with respect to member 64 by means of linear leaf springs 84, which permit the relative axial positions of members 80 and 82 to be changed in response to displacement of element 62 in engagement therewith in the vibration plane.

The configuration of the non-linear surfaces 86 of members 80 and 82 may be identical to that of surfaces 75 of collar members 68 and 70 and thus it may be appreciated that the principle of operation is the same, i.e. that as the members 80 and 82 are separated, the portions of the surfaces 86 engaged by member 62 and their characteristic tangents change, resulting in an increasing frictional engagement resistance to axial movement apart of the members 80 and 82. Here the frictional engagement is directly between surfaces 86 and hardened frictional engagement rings or loops 88 which are part of the annular assembly 62' to prevent undue wear thereof. For this reason surfaces 86 may also be hardened to be wear resistant.

Figure 6B:
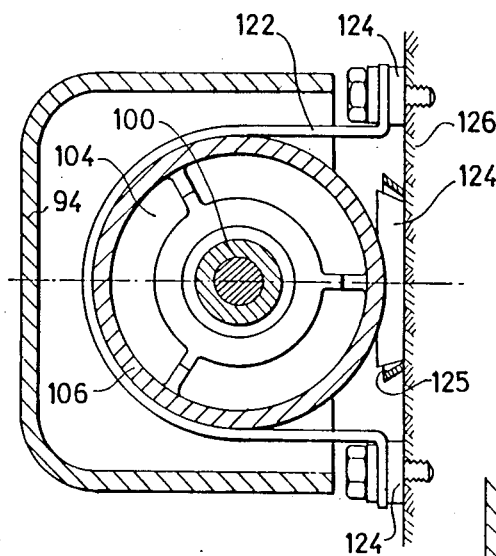
FIGS. 6A, 6B and 6C are respective side, end and detailed view illustrations of a vibration mounting assembly constructed and operative in accordance with a preferred embodiment of the present invention.
Figure 6C:
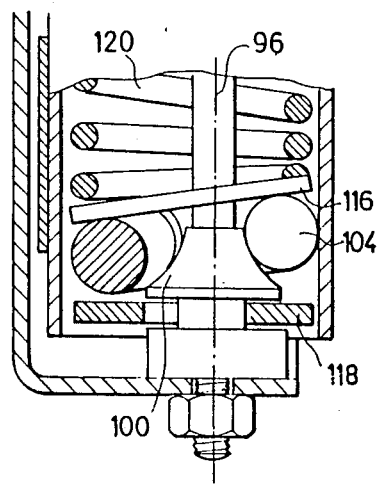
Figure 6A:
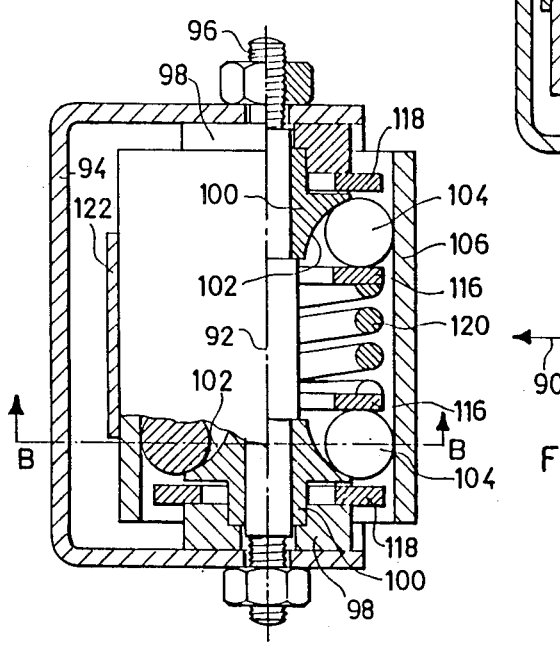

Reference is now made to FIGS. 6A–6C which illustrate a shock and/or vibration mount providing protection for vibration in a plane 90 lying perpendicular to an axis 92. This embodiment is characterized in that it restrains motion in plane 90 while permitting relatively free axial motion along axis 92, in order to permit two such vibration mounts connected in parallel at 90 degrees with respect to each other to provide three dimensional vibration protection.

A first relatively movable member 94 is mounted onto a rod 96 which is arranged along axis 92. The mounting permits rotation of member 94 relative to rod 96 about axis 92, but need not do so. Disposed interiorly of the ends of member 94 at the opposite ends of rod 96 are first and second blocks 98 of rigid material, such as steel, for maintaining the general orientation of elements along axis 92 and preventing relative axial motion thereof. Alternatively steel coil springs may replace blocks 98.

Arranged interiorly of blocks 98 are first and second collar members 100 each having an outer facing non-linear curved surface 102, which may be similar in all relevant respects to the surfaces 75 and 86 in the embodiments of FIGS. 4 and 5 described hereinabove. Disposed for selectable engagement with surfaces 102 are flexible engagement loops 104, which are surrounded by a cylindrical sleeve 106. Flexible engagement loops 104 serve as frictional rings of an outer annular assembly engageable with collars 100 and are preferably divided into three sections, flexibly joined in order to provide a loop which accomodates radial play due to occasional differences between the outer diameter of the loops 104 and the inner diameter of surrounding cylindrical sleeve 106.

Preferably loops 104 are formed with a structure of the type illustrated in either of FIGS. 11A and 11B. The embodiment of FIG. 11A illustrates separate loop sections 108 joined by a joining wire 110, while the embodiment of FIG. 11B illustrates a unitary ring 112 having evenly distributed partial axial cuts 114 for providing the desired flexibility. Any other suitable ring structure may be employed. For example, the loops may comprise several disconnected sections retained in position by means of retaining disks which are described hereinbelow.

Returning now to FIGS. 6A–6C, it is seen that the annular assembly of the first and second loops 104 includes respective first and second retaining disks 116 having a relatively large inner diameter enabling them to attain a skewed disposition with respect to rod 96 (FIG. 6C). There are also provided retaining disks 118 on the axial outer sides of collar members 100 for preventing disengagement of rings 104 therefrom, when the rings are in an eccentric skewed disposition which is the immediate consequence of application of force to the mount in the damping plane 90 as seen in FIG. 6C.

A spring 120, typically a linear coil spring, is disposed intermediate retaining disks 116 along axis 92 and surrounding rod 96. A retaining band 122 strongly engages cylinder 106 and binds it via resilient pads 124 to second member 126. The pads 124 may comprise an elastometic spring or alternatively may comprise any desired type of spring. Pads 124 may be partially enclosed by plates 125 which may define non-linear deflection characteristics therefor or limit the amplitude range thereof.

The operation of the apparatus of FIGS. 6A–6C may be summarized as follows: Relative movement of members 94 and 126 in plane 90 causes cylinder 106 to move in plane 90 relative to rod 96, thus causing rings 104 to move axially inwardly, i.e. towards each other, along non-linear surfaces 102. The change in position of rings 104 causes the proportion of the axial and perpendicular to axial components of the force exerted on rod 96 the change, such that the frictional resistance, produced by the frictional engagement of collar members 100 against rings 104 and of rings 104 against cylinder 106, increases more than linearly as a function of amplitude, producing the desired damping effect.

Figure 8:
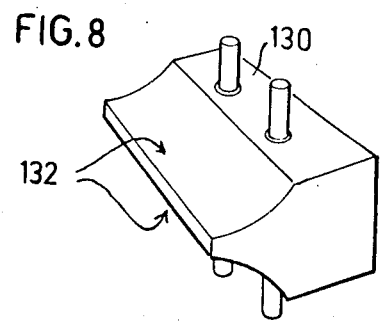
FIG. 8 is a pictorial illustration of an element of the assembly of FIGS. 7A and 7B.
Figure 7A:
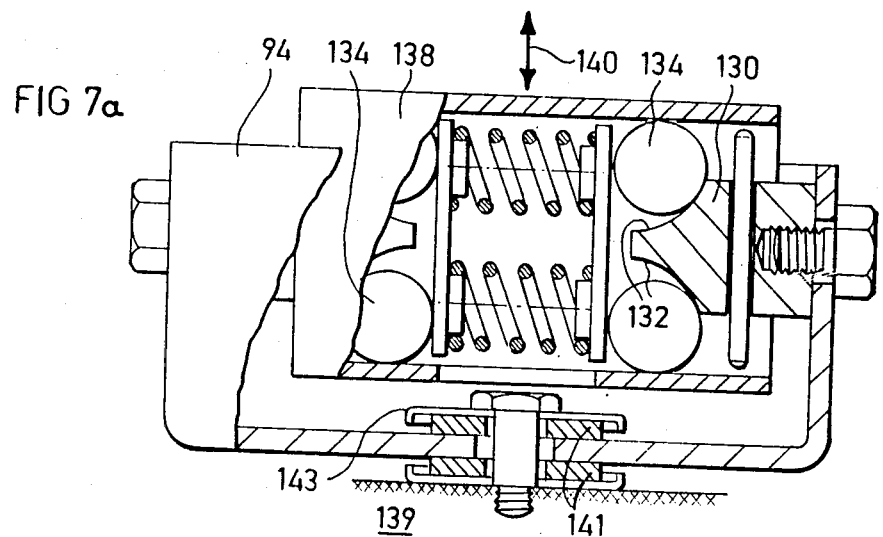

Reference is now made to FIGS. 7A and 7B which illustrate a single-axis version of the apparatus of FIGS. 6A–6C. For simplicity, the load member is marked by the same reference numeral 94. The following differences are noted: The collar members having conical surfaces in the embodiment of FIGS. 6A–6C are here replaced by elongate wedge—shaped members 130 having a pair of generally-converging outer surfaces 132 which are non-linear and of substantially the same cross sectional configuration as that of the collar members. such a wedge-shaped member 130 is illustrated pictorially in FIG. 8. The loops 104 of the embodiment of FIGS. 6A–6C are here replaced by bearing members in the form of cylindrical rollers 134 frictionally engaging the outer surfaces 132 of member 130, the latter surfaces thereby constituting the friction contacting surfaces. The single spring 120 is here replaced by a plurality of springs 136, but this need not be the case. The outer cylindrical sleeve 106 is replaced by an outer sleeve 138 of rectangular cross section. Here member 94 is mounted onto a support element 139 via a resilient mounting including pads 141 and plates 143.

It may be appreciated readily that the apparatus of FIGS. 7A and 7B is substantially similar in its principle of operation to that of FIGS. 6A–6C, except in that here protection against vibrations only along a single axis, here indicated by arrow 140, is provided, allowing relatively free motion in the plane perpendicular to that axis. In practice, vibrations in that plane will then be absorbed by a device such as that shown in FIGS. 6A–6C, 10A or 10B.

Figure 9A:
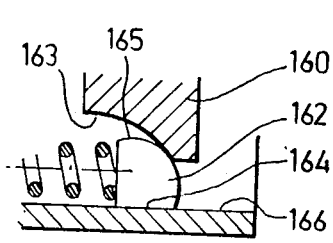
FIGS. 9A and 9B are illustrations of respective alternative embodiments of non-linear engagement arrangements useful in the embodiment of FIGS. 6A–6C, 7A and 7B.
Figure 9B:
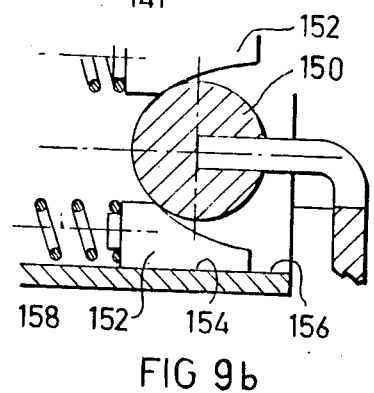

FIGS. 9A and 9B illustrate two alternative non-linear frictional engagements, suitable for use in the embodiment of FIGS. 7A and 7B or any other similar single axis of planar vibration mount. In the embodiment of FIG. 9A, a fixed "roller" of ball 150 is provided and engages non-linearly curved members 152 which are spring loaded; the non-linearly increasing frictional engagement here being between the outer walls 154 of members 152 and the inner wall 156 of an outer sleeve 158.

In the embodiment of FIG. 9B, first and second members 160 and 162 defining mutually engaging surfaces 163 and 165 having differing radii of curvature are employed to provide non-linearly increasing frictinal engagement between surfaces 164 and 166. The embodiment of FIG. 9B is characterized in that surface contact, as opposed to line contact, is provided between the frictionally engaging surfaces 164, 166, as well line as line-contact being provided by frictionally engaging elements 160 and 162 at surfaces 163 and 165 respectively.

Reference is now made to FIGS. 10A and 10B which illustrate a preferred embodiment of vibration support which represents a variation of the embodiment of FIGS. 6A–6C designed to have as low of a profile H as possible. As in the embodiment of FIGS. 6A–6C, this mount provides vibration protection for vibration in a plane perpendicular to an axis 170.

The apparatus of FIG. 10A comprises a base 174 which is fixedly mounted onto a support surface 176 by means of a screw 178 disposed along axis 170. Base 174 defines a curved engagement surface 180, which may have the same cross sectional configuration as that of the collar members 100 in the embodiment of FIGS. 6A–6C. A spring loaded retaining cap element 182 is retained against axial motion in one direction by a spring 184 which is seated between the head 186 of screw 178 and cap element 182. Cap element 182 is retained against axial motion in the opposite direction by a frictional engagement loop assembly 188, which typically may be of the construction illustrated in FIGS. 11A or 11B. Frictional engagement loop assembly 188 is surrounded in touching engagement by a cylindrical mounting element 190 onto which a protected item is mounted. Mounting element is provided with retaining slots 192 which are engaged by protruding extensions 194 of cap element 182, for preventing disassembly of the mounting apparatus.

The operation of the apparatus of FIG. 10A is summarized as follows: The application of at least a predetermined amount of force on mounting element 190 in a plane perpendicular to axis 170 causes displacement of mounting element 190 in a direction indicated typically by an arrow 196. This displacement produces frictional engagement between frictional engagement loop assembly 188 and the inner wall of element 190, curved engagement surface 180 and the underside of element 182, which may be reinforced as indicated. At the same time, the line contact location of engagement loop assembly 188 on engagement surface 180 shifts, causing a decreasing proportion of the total force to have an axial component and thus producing increasing damping as a positive, greater than linear function of increasing amplitude of the force applied to the mounting element 190.

Reference is now made to FIG. 10B which illustrates an alternative embodiment of the apparatus of FIG. 10A. Here a screw 200 mounts a base 202 onto a supporting surface 204. Base 202 defines a spring seat 205 engaging one end of a spring 206, the other end of the spring being seated on an annular spring seat 208 in the form of a collar having a conical configuration for converting axial force components exerted by spring 206 at least partially into radial components of force which produce frictional engagement between spring collar 208 and screw 200. An engagement loop assembly 210 is mounted between a supporting disk 212 by the head 214 of screw 200 and between a curved engagement surface 211 defined on spring collar 208 and is disposed in frictional engagement with a mounting member 216.

The operation of the apparatus of FIG. 10B is essentially identical to that of the apparatus of FIG. 10A with the exception that the engagement loop assembly 210 undergoes axial movement along axis 170. The application of force as in a direction indicated by an arrow 218 causes annular spring collar 208 to move axially relative to screw 200 an in frictional engagement therewith. The frictional force resisting such movement results from pretension of spring 206 and from increasing downward displacement of assembly 210 against spring collar 208 due to the curvature of the engagement surface 211 of spring seat 208, as described hereinabove.

A particular feature of the present invention lies in the possibility of pretensioning the main spring. This pretensioning is operative to maintain the mounted mass at a predetermined position while at rest and to maintain the mounted mass at this position until at least a predetermined selectable force Po is applied thereto. This prevents spurious rocking or oscillation of the mounted mass at low accelerations or when accidentally impacted.

It is also a particular feature of the present invention that the pretensioning of the springs is such that the angle α between the tangent to the curved engagement surface at the location of line contact and the axis perpendicular to the vibration restoring force is always less than 90 degrees, in order to maintain a positive component of the restoring force on the supported mass.

It is appreciated that in all of the embodiments here described the use of curved engagement surfaces and linear springs may be equivalent to the use of non-linear springs and straight engagement surfaces or the combination of both.

Further in accordance with an embodiment of the present invention, there may be attached in series with mounting apparatus of the present invention a frictionless flexing element or an elastomeric pad for the purpose of filtering out high frequency vibrations operating at low amplitudes. In order to prevent such elements from resonating at lower frequencies, the deflection of these additional springs must be restricted by appropriate stop means. Such a construction can be seen in the embodiment of FIG. 7A where element 94 is coupled to a support element 139 via elastomeric pads 141 surrounded on opposite sides by plates 143 which define the stop means. It is appreciated that such a series addition of springs of this type may be provided to the other embodiments of the invention as well.

An anternative construction of such series connected high frequency oscillation filtering springs can be seen in FIG. 6b where pad 124 is provided to absorb displacement at high frequencies and is seated in a conical shaped support plate which causes it to have non-linear characteristics, whereby increased amplitude increases the spring rate.

Reference is now made to FIGS. 12 and 13 which illustrate a unidirectional vibration mount which is particularly suitable for complementing the planer vibration mounts described hereinabove, such as those illustrated in FIGS. 6A–6C, 10A and 10B, when coupled therewith in parallel such that the axis 230 of this mount extends perpendicular to the plane of operation of the planer mount.

The vibration mount of FIG. 12 comprises housing 232, which is fixedly coupled to a supported mass (not shown) and typically formed of two parts 234 and 236 which may be threaded together, as illustrated. Disposed interiorly of housing 232 and extending through an aperture 238 formed in part 234 is a mounting shaft 240 which is fixedly attached to a supporting member 242. Fixedly mounted onto shaft 242 in opposite facing arrangement are two generally annular engagement collars 244 and 246, which define respective annular curved engagement surfaces 248 and 250.

A pair of engagement loop assemblies 252 and 254, each typically of the construction illustrated in FIGS. 11A and 11B are disposed in operative engagement with respective curved engagement surfaces 248 and 250 and with respective second spring seats 256 and 258. A first spring 260 is disposed between spring seat 256 and a seating recess 262 formed at the inner top surface of part 234 and a second spring 264 is disposed between spring seat 258 and a seating recess 266 formed at the inner bottom surface of part 236. An additional pretensioning biasing spring 270 is disposed between an interior spring seat recess 272 formed in element 246 and recess 266.

It is a particular feature of the vibration mount of FIG. 12 that the inner side walls of housing 232 are formed with a centrally disposed widened portion 274 which defines a limited frictionless amplitude range where the engagemnt loops 252 and 254 do not contact the inner wall of the housing. This design serves to permit absorption of low amplitude high frequency vibrations and may obviate the need for the series connected pads and springs described hereinabove for this purpose.

FIG. 13 illustrates the operation of the vibration mount apparatus when the housing is deflected in a direction indicated by an arow 276 (FIG. 12) beyond the limited frictionless range defined by the widened portion 274. Here friction contact is established between engagement loop 254 and the inclined portion 278 of the inner wall of housing part 236. Increasing deflection in direction 276 provides increased rubbin friction which is inversely proportional to the angle α which is defined as the angle between surface 278 and the tangent to the curved engagement surface 250 at the point of contact with the engagement loop 254. When the angle α becomes less than or equal to twice the friction angle, the restraining force becomes infinite.

Figure 14:
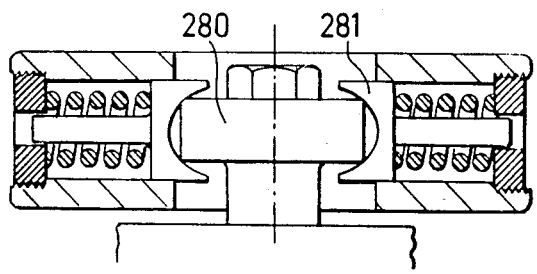
FIGS. 14–20 illustrate modifications of the mounting apparatus illustrated in FIGS. 1–13.

FIG. 14 shows an uniaxial operating device, where the mushroom like shaped part 280, acts against the plungers 281. Such plungers can be placed at two sides of the mushroom or all around it to make an axi-symmetrical apparatus.

Figure 15:
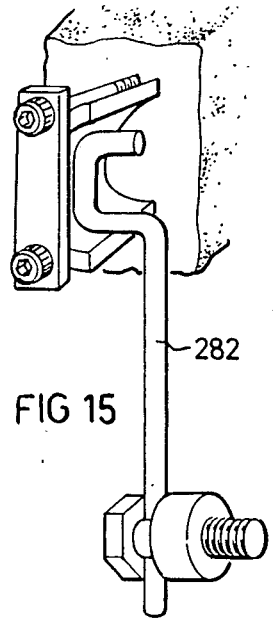
Figure 16:
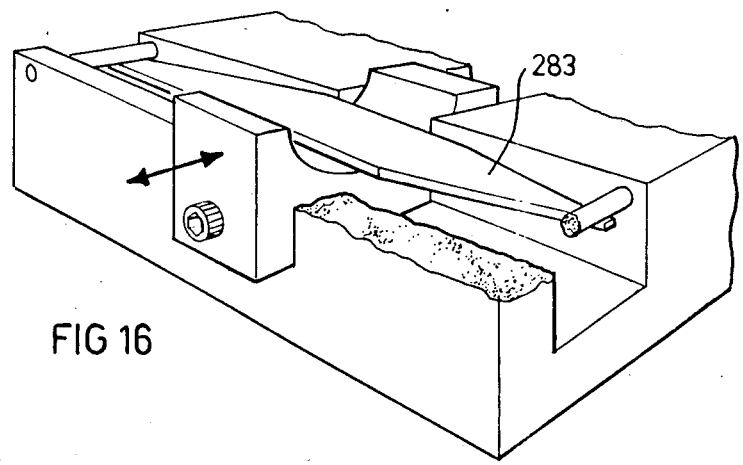

In FIG. 15 a very simple mount version is shown, where the friction applying element is part of the spring 282 itself which can be either a circular wire spring or also a flat one, as for instance illustrated in FIG. 16, by the part 283.

Figure 17:
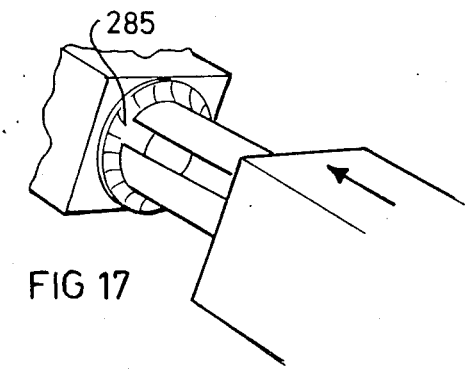
Figure 18:
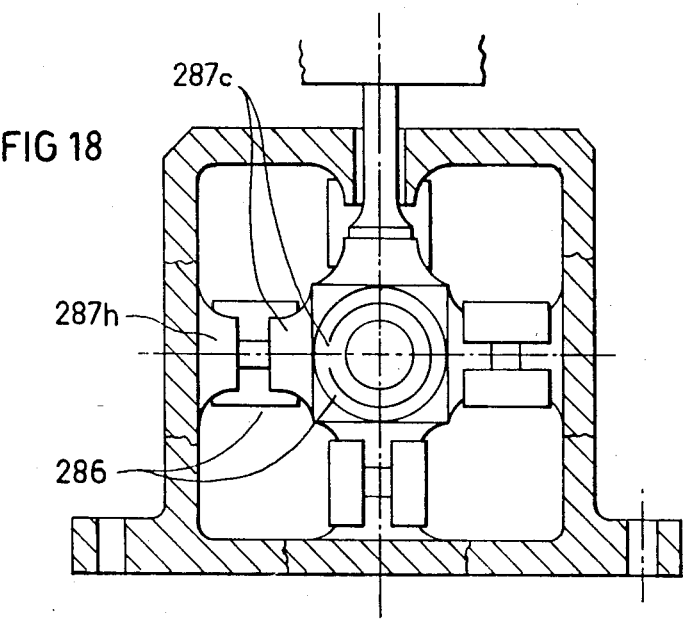

Another version where the spring is also the frictional rubbing element, shown in FIG. 17. It is accomplished by an open loop shaped sheet spring 284, that becomes opened by the two approaching convex cones 285. FIG. 18 shows this very device with 6 such cone couples arranged around three perpendicualr axes, to make a spherical mount capable to operate in all directions.

Here the six 287h loop springs 286 surround the cones 287, where six of them are fixed to the housing and the matching other six 287c, are fixed to the central cube that is attached to the supported mass.

Figure 19:
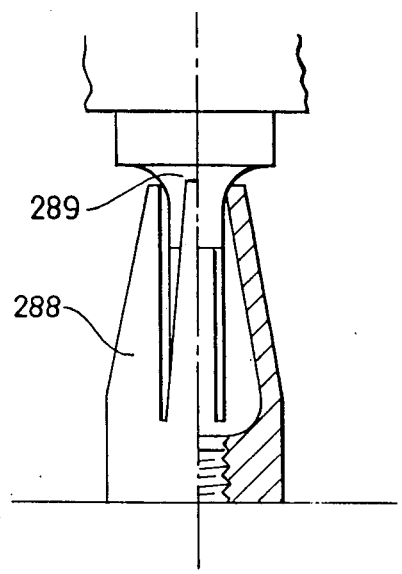

FIG. 19 described also a unidirectional mount where a single cone 289 is acted upon directly by the surrounding console "leaf springs" 288.

Figure 20:
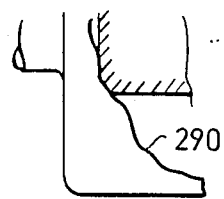

FIG. 20 represents an example of a spring 290 having a differently shaped curve, particularly useful for shock absorbtion. The reactional force sharply increases at first, then additional deflection is enabled without force inrease up to the end of the allowed displacement towards which the force gradually increases to infinity to prevent the destructive bottoming collision.

Figure 21:
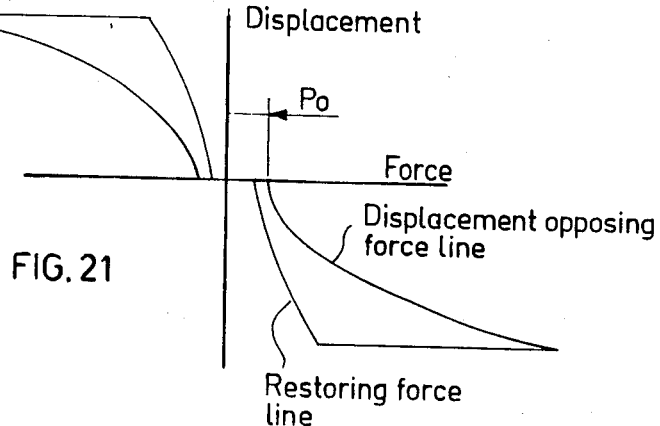
FIG. 21 is a force/displacement diagram characteristic of the operation of the vibration mounting apparatus illustrated in FIGS. 1–13.
Figure 22:
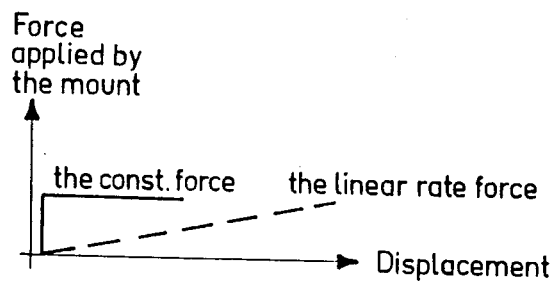
FIG. 22 is a plot illustrating the operation of a constant force vibration mount.

Reference is now made to FIG. 21 which is a force-/displacement diagram characteristic of the operation of the above-described vibration mountings, and to FIG. 22 which illustrates in comparable plots the absorbed energy for constant force and linear rate force shock mount systems. It can be seen readily that for the same maximum force transmitted by the mount, the constant force mount requires one half the displacement of the linear force mount to absorb the same total amount of shock energy, which is indicated by the area under the plot. In accordance with the present invention when the springs are prestressed, a constant force mount is provided and operative over a predetermined limited range of its displacement. Beyond this range a gradual positive going rate is encountered, producing increased resistance to displacement as seen in the embodiment of FIG. 23A.

Figure 23A:
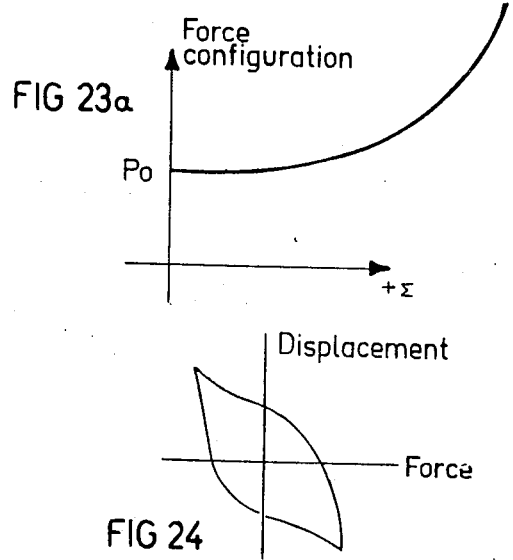
FIG. 23a and 23b are illustrations of two alternative types of force-displacement characteristics, the former without prestressing and the latter with prestressing.
Figure 23B:
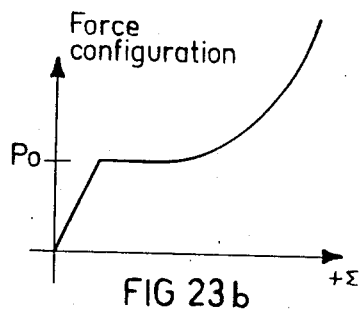

Reference is now made to FIGS. 23A and 23B. FIG. 23A illustrates the operation of a prestressed vibration mount constructed in accordance with any of the embodiments described hereinabove. FIG. 23B illustrates a prestressed vibration mount, combined with springs in series as illustrated by the pads 124 (FIG. 6B) or 141 (FIG. 7A).

It is seen that up to a predetermined force Po, the displacement as a function of force, is relatively small and generally linear. Thereafter, for forces greater than Po the non-linear characteristics of the vibration mount operate.

Figure 24:
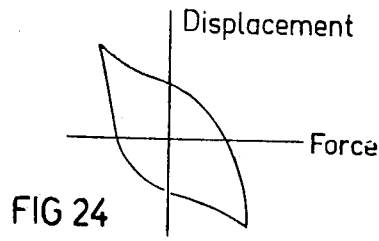
FIG. 24 is a force displacement plot drawn to show dissipated energy.

It is appreciated that the performance of each of the vibration mounts described hereinabvoe is essentially in accordance with the force displacement diagram of FIG. 21. FIG. 21 is relatively small for small displacement amplitudes, due mainly to the sharp decline of the restoring non-linear force curves. The force displacement diagram of FIG. 21 may be compared with the conventional force-displacement diagram for a linear absorber, illustrated in FIG. 24. In the linear case, there is significant energy absorption at low amplitude displacement and at low forces. In contrast, the present invention provides most energy absorption at high amplitudes.

It will be appreciated by persons skilled in the art that the present invention is not limited to what has been particularly shown and described hereinabove. Rather the scope of the present invention is defined only by the claims which follow:

I claim:

1. A vibration mounting for mounting a load support to a base comprising: at least two relatively movable members coupled to the base and load support, respectively; and a restoring spring deflectable by relative motion between said movable members in a predetermined direction; said relatively movable members including contacting friction surfaces producing Coloumb friction damping which increases non-linearly with the amplitude of movement of one member with respect to the other in said predetermined direction, and which opposes the movement of the load support relative to the base in said predetermined direction.

2. The vibration mounting according to claim 1, wherein said restoring spring is a linear spring whose spring force increases linearly as a function of the deflection thereof, and said contacting friction surfaces of said relatively movable members effect a non-linear motion of one member with respect to the other member.

3. The vibration mounting according to claim 1, wherein said restoring spring is a non-linear spring whose spring force increases non-linearly as a function of the deflection thereof, and said contacting friction surfaces of said relatively movable members effect a linear motion of one member with respect to the other member.

4. The vibration mounting according to claim 1, wherein one of said relatively movable member comprises a pivotably mounted lever biased by said restoring spring to bring the contacting friction surface of said lever into engagement with the contacting friction surface of the other member to produce frictional damping which increases non-linearly with the amplitude of movement of one member with respect to the other in said predetermined direction.

5. The vibration mounting according to claim 1, wherein said relatively movable members include an apertured skewed collar and a rod extending parallel to the axis of movement of said relatively movable members and passing through the aperture of said skewed collar; said contacting friction surfaces including the inner surface of said apertured skewed collar and the outer surface of said rod.

6. The vibration mounting according to claim 1, wherein said relatively movable members include a pair of apertured collars displaceably received on a rod extending parallel to the axis of movement of said relatively movable members and perpendicular to the plane of the applied load; and an outer annular member engaging the outer faces of said pair of apertured collars; said contacting friction surfaces including the outer surfaces of said pair of collars and the inner surface of said annular member.

7. The vibration mounting according to claim 6, wherein said outer annular member comprises an annular assembly including a pair of friction engagement loops frictionally engaging the outer surfaces of said pair of collars.

8. The vibration mounting according to claim 7, wherein said contacting friction surfaces further include an outer sleeve enclosing said annular assembly and having an inner surface frictionally engaged by the outer surfaces of said pair of friction engagement loops.

9. The vibration mounting according to claim 1, wherein said relatively movable members include a wedge-shaped member having a pair of generally-converging outer surfaces, and a pair of bearing members each bearing against one of the converging upper surfaces of said wedge-shaped member; said contacting friction surfaces including the pair of generally-converging outer surfaces of the wedge-shaped member, and the outer surfaces of said bearing members.

10. The vibration mounting according to claim 1, wherein one of said relatively movable members, including its contacting friction surfaces, is integrally formed with said restoring spring; and wherein said restoring spring is secured at one end to said one relatively movable member and is formed at its opposite end with said one contacting friction surface engaging the contacting friction surface of the other movable member.

11. Vibration mounting apparatus comprising:
a base and a load support arranged for relative vibrational motion;
at least one friction engagement element arranged for frictional engagement with said load support along at least a part of the displacement range of said load support;
first and second engagement surfaces for frictional respective first and second engagement surfaces for frictional engagement with said at least one friction engagement element; and a restoring spring associated with at least one of said first and second engagement elements for resisting displacement thereof, said at least one friction engagement element being arranged for simultaneous frictional engagment with said load support and said first and second engagement surfaces at a predetermined range of displacements of said load support for providing damping of the displacement of said load support.

12. Apparatus according to claim 11 and wherein at least one of said first and second engagement surfaces defines a curved engagement surface.

13. Apparatus according to claim 12 and wherein changes in displacement of said load support over said predetermined range of displacements vary the location of frictional engagement beween said at least one frictional engagement element and said curved engagement surface, thereby varying the angle α between the tangent to the curved engagement surface and the direction of reactive frictional force relative thereto.

14. Apparatus according to claim 12, wherein the curvature of said curved engagement surface is configured to as to provide a non-linear force-displacement damping relationship.

15. Apparatus according to claim 11, wherein said at least one frictional engagement element comprises a frictional engagement loop.

16. Apparatus according to claim 15 and wherein said frictional engagement loop comprises a plurality of integrally formed sections separated by integrally formed flexible junctions.

17. Apparatus according to claim 15 and wherein said frictional engagement loop comprises a plurality of discrete sections flexibly joined together.

18. Apparatus according to claim 14 and wherein said at least one frictional engagement element comprises a plurality of discrete frictional engagement elements.

19. Apparatus according to claim 11, and also comprising means for prestressing said restoring spring.

20. Apparatus according to claim 11, wherein said first engagement element is associated with said restoring spring and said second engagement element is formed with a curved engagement surface.

21. Apparatus according to claim 11, said second engagement element is disposed for frictional engagement with an axial surface.

22. Apparatus according to claim 11, said second engagement element is fixed to said base.

23. Apparatus according to claim 11, wherein said load support is of generally cylindrical configuration and generally surrounds said restoring spring.

24. Apparatus according to claim 23, and wherein said apparatus is arranged for damping of vibrations along a plane perpendicular to the axis of rotation of said cylindrical configuration.

25. Apparatus according to claim 24, and wherein said restoring spring is mounted onto said base by means of a bolt extending along said axis of rotation.

26. Apparatus according to claim 25, and wherein said second engagement element is arranged for frictional engagement with an axial surface of said bolt.

27. Apparatus according to claim 11, wherein the arrangement of the at least one frictional engagement element, the first and second engagement elements and the load support is such that a predetermined displacement of the load support about its rest position does not provide frictional engagement between the load support and the at least one frictional engagement element.

28. A parallel engagement of first and second vibration mounts, said first vibration mount being arranged for damping of motion along a first axis and comprising:

a base and a load support arranged for relative vibrational motion along said first axis;

a restoring spring, having a defined axial travel path for compression and tension, mounted between the base and the load support; and means for applying variable frictional damping to the relative vibrational motion, whereby the amount of variable frictional damping increases non-linearly as a function of increasing amplitude of the relative vibrational motion;

the second vibration mount being arranged for damping of vibrational motion in a plane perpendicular to said first axis and comprising:

a base and a load support arranged for relative vibrational motion in a plane perpendicular to said first axis;

a restoring spring, having a defined axial travel path for compression and tension, mounted between the base and the load support; and means for applying variable frictional damping to the relative vibrational motion, whereby the amount of variable frictional damping increases non-linearly as a function of increasing amplitude of the relative vibrational motion.

29. Apparatus according to claim 27 and also comprising a linear spring coupled between said base and said load support.

* * * * *